United States Patent
Jeon et al.

(10) Patent No.: US 11,259,371 B2
(45) Date of Patent: Feb. 22, 2022

(54) INORGANIC ELECTROLUMINESCENCE DEVICE AND METHOD FOR MANUFACTURING THE SAME

(71) Applicants: HYUNDAI MOTOR COMPANY, Seoul (KR); KIA MOTORS CORPORATION, Seoul (KR); Pukyong National University Industry-University Cooperation Foundation, Busan (KR)

(72) Inventors: Hong Chan Jeon, Seoul (KR); Mi Jung Yun, Yongin-si (KR); Oh Deok Kwon, Hwaseong-si (KR); Hyung Joon Youn, Seoul (KR); Afandi Mohammad Malik, Busan (KR); Jong Su Kim, Busan (KR); Tae Wook Kang, Busan (KR); Jong Ho Ryu, Busan (KR)

(73) Assignees: Hyundai Motor Company, Seoul (KR); Kia Motors Corporation, Seoul (KR); PUKYONG NATIONAL UNIVERSITY INDUSTRY-UNIVERSITY COOPERATION FOUNDATION, Busan (KR)

(*) Notice: Subject to any disclaimer, the term of this patent is extended or adjusted under 35 U.S.C. 154(b) by 52 days.

(21) Appl. No.: 16/696,520

(22) Filed: Nov. 26, 2019

(65) Prior Publication Data
US 2020/0344853 A1    Oct. 29, 2020

(30) Foreign Application Priority Data
Apr. 25, 2019 (KR) .................. 10-2019-0048692

(51) Int. Cl.
| | | |
|---|---|---|
| H05B 33/26 | (2006.01) | |
| H05B 33/28 | (2006.01) | |
| H05B 33/10 | (2006.01) | |
| C09K 11/58 | (2006.01) | |

(Continued)

(52) U.S. Cl.
CPC ............ H05B 33/28 (2013.01); C09K 11/584 (2013.01); H05B 33/10 (2013.01); H05B 33/14 (2013.01); H05B 33/22 (2013.01)

(58) Field of Classification Search
CPC ........ H05B 33/28; H05B 33/10; H05B 33/22; H05B 33/14; C09K 11/584
See application file for complete search history.

(56) References Cited

U.S. PATENT DOCUMENTS

| | | | | |
|---|---|---|---|---|
| 3,037,137 A * | 5/1962 | Motson | .................. | H05B 33/20 313/502 |
| 6,391,471 B1 * | 5/2002 | Hiraoka | ................ | C08F 297/02 428/620 |
| 2008/0129193 A1 * | 6/2008 | Asabe | ................. | H01L 51/5212 313/504 |

FOREIGN PATENT DOCUMENTS

| | | | | |
|---|---|---|---|---|
| FR | 2897746 A1 * | 8/2007 | ............. | H05B 33/28 |
| JP | 2004311422 A * | 11/2004 | ............. | H05B 33/10 |

(Continued)

*Primary Examiner* — Donald L Raleigh
(74) *Attorney, Agent, or Firm* — Morgan, Lewis & Bockius LLP (57) ABSTRACT

An inorganic electroluminescence device having heat resistance, moisture resistance and physical durability improved by applying a transparent electrode layer including a metal mesh substrate or a metal patterned substrate, and a method for manufacturing the same.

12 Claims, 5 Drawing Sheets

(51) Int. Cl.
    *H05B 33/22*     (2006.01)
    *H05B 33/14*     (2006.01)

(56) References Cited

FOREIGN PATENT DOCUMENTS

KR     10-0466428 B1     1/2005
KR     101657758 B1 *   9/2016  ............. H01L 21/67

\* cited by examiner

INORGANIC ELECTROLUMINESCENCE DEVICE AND METHOD FOR MANUFACTURING THE SAME

CROSS-REFERENCE TO RELATED APPLICATION

This application claims under 35 U.S.C. § 119(a) the benefit of priority to Korean Patent Application No. 10-2019-0048692 filed on Apr. 25, 2019, the entire contents of which are incorporated herein by reference.

TECHNICAL FIELD

The present disclosure relates to an inorganic electroluminescence device and a method for manufacturing the same, and more particularly to an inorganic electroluminescence device having the heat resistance, moisture resistance and physical durability improved by applying a transparent electrode layer including a metal mesh substrate or a metal-patterned substrate, and a method for manufacturing the same.

BACKGROUND ART

An inorganic electroluminescence device is an electroluminescence device that emits light by electrical excitation of a fluorescent compound evenly distributed between two electrodes, and is a device that uses the phenomenon that the movement of electrons appears as light when AC voltage is applied.

A conventional inorganic electroluminescence device is manufactured by depositing a transparent indium tin oxide (ITO) electrode on a substrate, forming a dielectric layer and an inorganic electroluminescent layer thereon, and finally depositing a back electrode.

In recent years, studies on replacing conventional ITO transparent electrodes have been actively conducted, and most of them are based on nano- or micron-scale materials. However, nano-scale transparent electrode materials have problems in that they have very poor thermal, chemical and physical durability and are also expensive.

Meanwhile, it has been found that when inorganic electroluminescence devices are applied to vehicles, the electrical properties of ITO/polyethylene terephthalate (PET) electrodes are drastically degraded due to low-temperature and high-temperature heat shock. Therefore, at present, there is a need for a transparent electrode material that can withstand high temperature, high humidity and high temperature heat shock tests, and furthermore, there is a need to manufacture an inorganic electroluminescence device, which applicable to automotive sunroofs requiring high durability conditions, by the use of such electrode materials.

The above information disclosed in this Background section is only for enhancement of understanding of the background of the disclosure and therefore it can contain information that does not form the prior art that is already known in this country to a person of ordinary skill in the art.

SUMMARY OF THE DISCLOSURE

The present disclosure is intended to solve the above conventional problems, and an object of the present disclosure is to provide an inorganic electroluminescence device having improved heat resistance, moisture resistance and heat shock resistance.

Another object of the present disclosure is to provide a novel inorganic electroluminescence device capable of reducing the manufacturing cost while showing a surface light source similar to that of a conventional inorganic electroluminescence device.

Still another object of the present disclosure is to provide an inorganic electroluminescence device having improved light uniformity compared to that of a conventional inorganic electroluminescence device.

The objects of the present disclosure are not limited to the objects described above. The objects of the present disclosure will be more apparent from the description below and implemented by means described in the claims and a combination thereof.

In one aspect, the present disclosure provides a method for manufacturing an inorganic electroluminescence device, including the steps of: forming a transparent electrode layer; and forming a dielectric powder layer and a fluorescent powder layer on the transparent electrode layer, wherein the transparent electrode layer includes at least one of a metal mesh substrate and a metal-patterned substrate, and wherein the transparent electrode layer, the dielectric powder layer and the fluorescent powder layer are stacked to contact one another, and wherein the metal mesh substrate includes a metal mesh having openings, and the metal-patterned substrate includes a metal having linear stripe patterns.

In a preferred embodiment, the metal mesh substrate may include stainless steel.

In another preferred embodiment, the metal-patterned substrate may include aluminum (Al).

In still another preferred embodiment, the method for manufacturing an inorganic electroluminescence device may further include, after the step of forming the dielectric powder layer and the fluorescent powder layer, a step of forming a transparent electrode layer.

In yet another preferred embodiment, when the transparent electrode layer includes the metal mesh substrate, the step of forming the transparent electrode layer may include the steps of: preparing a glass sheet; providing a metal mesh on the glass sheet; and applying a polymer material onto the glass sheet provided with the metal mesh.

In still yet another preferred embodiment, the distance between the openings of the metal mesh may be 5 to 20 $\mu m$; the thickness of the metal mesh may be 20 to 100 $\mu m$; and the width of the opening included in the metal mesh may be 20 to 100 $\mu m$.

In still yet another preferred embodiment, the polymer material may include 10 to 50 wt % of a light diffusing agent.

In still yet another preferred embodiment, when the transparent electrode layer includes the metal-patterned substrate, the step of forming the transparent electrode layer may include the steps of: preparing a base substrate; preparing a mask layer having a stripe pattern; and vacuum-depositing the mask layer on the base substrate.

In still yet another preferred embodiment, the thickness of the stripe of the mask layer may be 20 to 100 $\mu m$, and the distance between the stripes of the mask pattern may be 20 to 100 $\mu m$.

In still yet another preferred embodiment, the method for manufacturing an inorganic electroluminescence device may further include a step of sequentially stacking a hot-melt layer including a thermoplastic adhesive and a blind fabric layer under the transparent electrode layer.

In another aspect, the present disclosure provides an inorganic electroluminescence device including: a base substrate; a transparent electrode layer; a dielectric powder layer; and a fluorescent powder layer, wherein the transparent electrode layer includes at least one of a metal mesh substrate and a metal-patterned substrate, and wherein the transparent electrode layer, the dielectric powder layer and the fluorescent powder layer are sequentially stacked to contact one another, and wherein the metal mesh substrate includes a metal mesh having openings, and the metal-patterned substrate includes a metal having linear stripe patterns.

In a preferred embodiment, the transparent electrode layer may be disposed on any one of on the dielectric powder layer and under the fluorescent powder layer.

In another preferred embodiment, when the transparent electrode layer includes the metal mesh substrate, the transparent electrode layer may include: a metal mesh including openings; and a polymer material filled in the openings.

In still another preferred embodiment, the polymer material may include any one selected from the group consisting of polyethylene terephthalate, polyvinyl chloride, and a combination thereof.

In yet still another preferred embodiment, the linear metal stripe of the metal-patterned substrate may include aluminum (Al).

In still yet another preferred embodiment, the metal mesh substrate may include stainless steel.

In still yet another preferred embodiment, the width of the opening of the metal mesh may be 20 to 100 μm, and the distance between the stripes of the metal-patterned substrate may be 20 to 100 μm.

In still yet another preferred embodiment, a hot-melt layer including a thermoplastic adhesive and a blind fabric layer may be sequentially disposed under the transparent electrode layer.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the drawings, reference numbers refer to the same or equivalent sections of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The above objects, other objects, features, and advantages of the present disclosure will be easily understood through the following preferred exemplary embodiments with reference to the accompanying drawings. The present disclosure is not limited to the embodiments described therein and may also be modified in various different ways. On the contrary, embodiments introduced herein are provided to make disclosed contents thorough and complete and sufficiently transfer the spirit of the present disclosure to those skilled in the art.

In the description of each drawing, like reference numerals are used for like constitute elements. In the accompanying drawings, dimensions of structures are illustrated to be more enlarged than actual dimensions for clarity of the present disclosure. Terms such as first, second, and the like may be used to describe various components and the components should not be limited by the terms. The terms are used to only distinguish one component from another component. For example, a first component may be referred to as a second component, and similarly, the second component may be referred to as the first component without departing from the scope of the present disclosure. Singular expressions used herein include plurals expressions unless they have definitely opposite meanings in this context.

In the present specification, it should be understood that the term "include" or "have" indicates that the feature, number, step, operation, component, part, or combination thereof described in the specification is present, but does not exclude a possibility of presence or addition of one or more other features, numbers, steps, operations, components, parts or combinations thereof, in advance. In addition, it will be understood that when an element such as a layer, film, region, or plate is referred to as being "on" another element, it can be "directly on" the other element or intervening elements may also be present. On the contrary, it will be understood that when an element such as a layer, film, region, or plate is referred to as being "below" another element, it can be "directly below" the other element or intervening elements may also be present.

Unless otherwise indicated, all numbers, values and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, where a numerical range is disclosed herein, this range is continuous, and includes unless otherwise indicated, every value from the minimum value to and including the maximum value of such a range. Still further, where such a range refers to integers, unless otherwise indicated, every integer from the minimum value to and including the maximum value is included.

In the context of this specification, where a range is stated for a parameter, it will be understood that the parameter includes all values within the stated range, inclusive of the stated endpoints of the range. For example, a range of "5 to 10" will be understood to include the values 5, 6, 7, 8, 9, and 10 as well as any sub-range within the stated range, such as to include the sub-range of 6 to 10, 7 to 10, 6 to 9, 7 to 9, etc., and inclusive of any value and range between the integers which is reasonable in the context of the range stated, such as 5.5, 6.5, 7.5, 5.5 to 8.5 and 6.5 to 9, etc. Further, for example, a range of "10% to 30%" will be understood to include the values 10%, 11%, 12%, 13%, etc., and all integers up to and including 30%, as well as any sub-range within the stated range, such as to include the sub-range of 10% to 15%, 12% to 18%, 20% to 30%, etc., and inclusive of any value and range between the integers which is reasonable in the context of the range stated, such as 10.5%, 15.5%, 25.5%, etc.

The present disclosure relates to an inorganic electroluminescence device and a method for manufacturing the same. Hereinafter, the features of the inorganic electroluminescence device corresponding to an article will be described while mainly describing the method for manufacturing the inorganic the electroluminescence device, which corresponds to a method.

Step of Manufacturing Inorganic Electroluminescence Device

The method for manufacturing the inorganic electroluminescence device according to the present disclosure includes the steps of: forming a transparent electrode layer; and forming a dielectric powder layer and a fluorescent powder layer on the transparent electrode layer.

Figure 1:
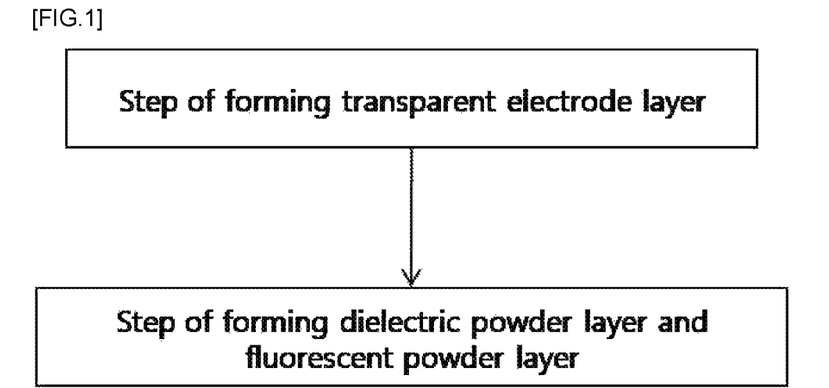
FIG. 1 is a schematic flow chart showing steps of manufacturing an inorganic electroluminescence device according to the present disclosure.

FIG. 1 is a schematic flow chart showing steps of manufacturing an inorganic electroluminescence device according to the present disclosure. With reference to FIG. 1, each step will be described in detail.

Step of Forming Transparent Electrode Layer

This step is a step of forming a transparent electrode layer. A base substrate is disposed under the transparent electrode layer of the present disclosure, and the manufacturing process according to the present disclosure may be divided according to the type of substrate included in the transparent electrode layer.

The transparent electrode layer of the present disclosure may include at least one of a metal mesh substrate and a metal-patterned substrate. The metal mesh substrate includes a metal mesh including openings, and the metal-patterned substrate includes a metal having linear stripe patterns. More specifically, the metal mesh is in the form of a mesh including one or more openings and including a metal component. In addition, the metal-patterned substrate has a structure in which stripes having at least one ribbon shape and including a metal component are spaced apart from each other by a predetermined distance.

The base substrate preferably includes a polyethylene terephthalate (PET) film or a polyvinyl chloride (PVC) film. The base substrate may have a thickness of 30 to 200 μm.

The case where the transparent electrode layer formed on the base substrate of the present disclosure includes the metal mesh substrate will be described first. In this case, the step of forming the transparent electrode layer may include the sub-steps of: preparing a glass sheet; providing a metal mesh on the glass sheet; and applying a polymer material onto the glass sheet provided with the metal mesh.

Step of Preparing Glass Sheet

The glass sheet is more specifically a glass sheet coated with a release agent. The release agent is used in order to completely separate the glass sheet from the transparent electrode layer later.

Step of Providing Metal Mesh

This step is a step of stacking a metal mesh on the glass sheet coated with the release agent. At this time, the metal mesh is preferably in the form of a mesh having a plurality of openings, and the thickness of the metal mesh is preferably 20 to 100 μm. In addition, the width of the opening is preferably 20 to 100 μm, and the distance between the openings of the metal mesh is preferably 5 to 20 μm.

The shape of the opening is not particularly limited, and includes a circular shape or a polygonal shape for the purpose of the present disclosure.

The metal mesh substrate preferably includes stainless steel (SUS).

Step of Applying Polymer Material

This step is a step of applying a polymer material onto the glass sheet provided with the metal mesh. Specifically, it is a step of completely filling the openings of the metal mesh with a polymer material by applying the polymer material. If necessary, the polymer material may completely cover the metal mesh.

The polymer material includes any one selected from the group consisting of polyethylene terephthalate (PET), polyvinyl chloride (PVC), and a combination thereof. At this time, a polymer material portion, stacked and cured on the metal mesh substrate, corresponds to the base substrate of the present disclosure, and the metal mesh filled with the polymer material corresponds to the transparent electrode layer of the present disclosure.

The polymer material may further include a light diffusing agent.

The light diffusing agent may include titanium dioxide ($TiO_2$). At this time, the light diffusing agent may be included in the polymer material in an amount of 10 to 30 wt %.

The glass sheet may be completely separated from the transparent electrode layer, thereby providing the base substrate and transparent electrode layer of the present disclosure.

In the present disclosure, when the transparent electrode layer formed on the base substrate includes the metal-patterned substrate, the step of forming the transparent electrode layer may include the sub-steps of: preparing a base substrate; preparing a mask layer; and depositing a mask layer.

Step of Preparing Base Substrate

This step is a step of preparing a base substrate. The base substrate includes any one selected from the group consisting of polyethylene terephthalate (PET), polyvinyl chloride (PVC), and a combination thereof.

The base substrate may preferably further include a light diffusing agent.

The light diffusing agent may be included in the base substrate in an amount of 10 to 30 wt %.

Step of Preparing Mask Layer

The mask layer of the present disclosure includes a linear metal stripe pattern. More specifically, the mask layer has a structure in which stripes having a ribbon shape are formed to be spaced apart from each other by a predetermined distance.

The stripes includes a metal. Preferably, the metal includes aluminum (Al).

The thickness of each of the stripes is 20 to 100 μm, and the distance between the stripes is 20 to 100 μm.

Step of Depositing Mask Layer

This step is a step of depositing on the prepared base substrate the mask layer having the stripe pattern.

The deposition is preferably performed in a vacuum evaporator at a vacuum level of $10^{-9}$ to $10^{-3}$ Torr. More specifically, an aluminum heating furnace is used as the vacuum evaporator.

In the present disclosure, a light diffusing agent may be added to the base substrate, and the mask layer may be deposited thereon. However, in some cases, the mask layer may also be deposited directly on a conventional light-diffusing sheet without using the base substrate.

At this time, the deposited mask layer portion corresponds to the transparent electrode layer of the present disclosure, and has a thickness of 20 to 100 nm.

Step of Forming Dielectric Powder Layer and Fluorescent Powder Layer

This step is a step of sequentially stacking a fluorescent powder layer and a dielectric powder layer on the transparent electrode layer formed on the base substrate. In the present disclosure, the method for sequentially stacking these layers is not particularly limited, and is performed according to a conventional method for manufacturing an electroluminescence device.

The fluorescent powder layer preferably includes zinc sulfide (ZnS), and the dielectric powder layer preferably includes barium titanate ($BaTiO_3$).

In general, a silver paste may be printed on the fluorescent powder layer to form a back electrode. However, the method of the present disclosure may further include, after the step of forming the fluorescent powder layer, a step of forming a transparent electrode layer. In this case, the second transparent electrode layer formed replaces the back electrode. That is, a step of forming on the fluorescent powder layer a transparent electrode layer including at least any one of a metal mesh substrate and a metal-patterned substrate may further be performed, and in this case, the dielectric powder layer is stacked on the second transparent electrode layer formed.

In this case, the inorganic electroluminescence device of the present disclosure is characterized by further including one or more transparent electrode layers.

In the present disclosure, after the dielectric powder layer and the fluorescent powder layer are formed, a hot-melt layer including a thermoplastic adhesive and a blind fabric layer may further be sequentially disposed under the transparent electrode layer. More specifically, the hot-melt layer and the blind fabric layer may be sequentially stacked and formed on the back side of the base substrate, to which the transparent electrode layer is not attached. Through the above-described method, the inorganic electroluminescence device of the present disclosure may be applied to a vehicle sunblind.

The inorganic electroluminescence device of the present disclosure is finally completed by attaching a wire, connected to an external power source, to the formed transparent electrode layer.

Hereinafter, the present disclosure will be described in detail with reference to examples. However, these examples are intended to illustrate the present disclosure, and the scope of the present disclosure is not limited thereto.

Example 1

Use of Transparent Electrode Including Metal Mesh Substrate

Figure 2:
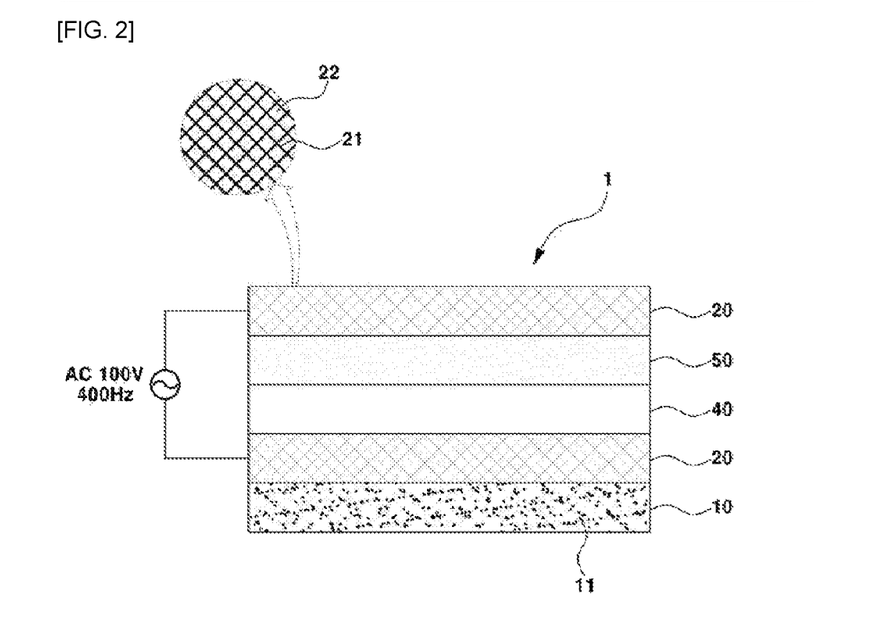
FIG. 2 schematically illustrates the stacked structure of an inorganic electroluminescence device in which a transparent electrode layer includes a metal mesh substrate.

Referring to FIG. 2, a metal mesh 21 (opening width: 50 μm; substrate thickness: 50 μm; distance between openings: 10 μm; made of stainless steel) is placed flat on a glass sheet coated with a release agent. Silicon is deposited on the edge of the glass sheet to a thickness not less than the thickness of the metal mesh, and a PET polymer material (binder) 22 is completely filled inside the silicon rim and in the metal mesh up to the height of the silicon rim and cured, thereby preparing a transparent electrode layer (metal mesh substrate) 20. At this time, the PET polymer material is a PET mixture containing 20 wt % of titanium dioxide ($TiO_2$) as a light diffusing agent.

After removal of the glass sheet, the backside of the metal mesh substrate, from which the glass sheet was removed, is screen-printed with a fluorescent powder layer 40 including zinc sulfide (ZnS), copper (Cu) and manganese (Mn) and a dielectric powder layer 50 including $BaTiO_3$. On the dielectric powder layer 50, the same metal mesh as that of the transparent electrode layer formed as described above is deposited, and the same PET polymer material as described above is printed thereon to form a transparent electrode layer.

FIG. 2 illustrates the inorganic electroluminescence device 1 of the present disclosure, manufactured in Example 1 above. As shown in FIG. 2, a copper wire x connected to an external power source (AC 100 V, 400 Hz) is connected to the two transparent electrode layers (metal mesh substrates) 20. Specifically, a base substrate 10 including a light diffusing agent 11 therein forms the lowest layer, and a transparent electrode layer (metal mesh substrate) 20 is stacked on the base substrate 10. On the metal mesh substrate 20, a fluorescent powder layer 40 and a dielectric powder layer 50 are sequentially stacked. On the dielectric powder layer 50, a second metal mesh substrate 20 is stacked and formed. In addition, the metal mesh substrates 20, which are in contact with the fluorescent powder layer 40 and the dielectric powder layer 50, respectively, are connected to each other by a copper wire.

Example 2

Use of Transparent Electrode Including Metal-Patterned Substrate

Figure 3:
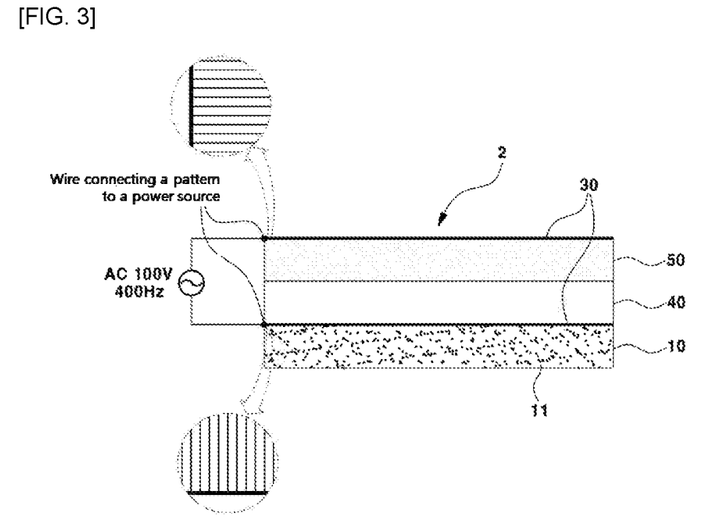
FIG. 3 schematically illustrates the stacked structure of an inorganic electroluminescence device in which a transparent electrode layer includes a metal-patterned substrate.

Referring to FIG. 3, a mask layer of an aluminum having line stripe patterns (pattern width: 50 μm; distance between patterns: 50 μm; made of aluminum) 30 is brought into contact with a prepared base substrate 10 (containing 20 wt % of titanium dioxide based on 100 wt % of PET), and the resulting substrate is placed in a prepared vacuum evaporator (vacuum level: $10^{-6}$ Torr; aluminum heating furnace; the substrate is located 20 cm depth in the furnace). In the furnace, a metal-patterned substrate 30 is deposited on the base substrate 10 to a thickness of 100 nm.

On the metal-patterned substrate 30, a fluorescent powder layer 40 including zinc (Zn), copper (Cu) and manganese (Mn) and a dielectric powder layer 50 including $BaTiO_3$ are screen-printed. Additionally, the same transparent electrode layer 20 as described above is further deposited on the dielectric powder layer 50 to form a back electrode. When the metal-patterned substrate 30 of the present disclosure is deposited on both the base substrate 10 and the dielectric powder layer 50 as shown in FIG. 3, it is possible to provide an electroluminescence device which may be used as a double-sided light emitting device and, at the same time, is semi-transparent.

FIG. 3 illustrates the inorganic electroluminescence device 2 of the present disclosure, manufactured in Example 2 above. As shown in FIG. 3, a copper wire connected to an external power source (AC 100 V, 400 Hz) is connected to the two transparent electrode layers including metal-patterned substrates 30.

Example 3

Use of Transparent Electrodes Including Metal Mesh Substrate and Metal-Patterned Substrate, Respectively For a front electrode, the transparent electrode layer 30 including the metal-patterned substrate is formed in the same manner as described in Example 2 above, and for a back electrode, the transparent electrode layer 20 including the metal mesh substrate is formed in the same manner as described in Example 1 above, thereby manufacturing an electroluminescence device which may be used as a double-sided light emitting device and, at the same time, is semi-transparent.

Figure 4:
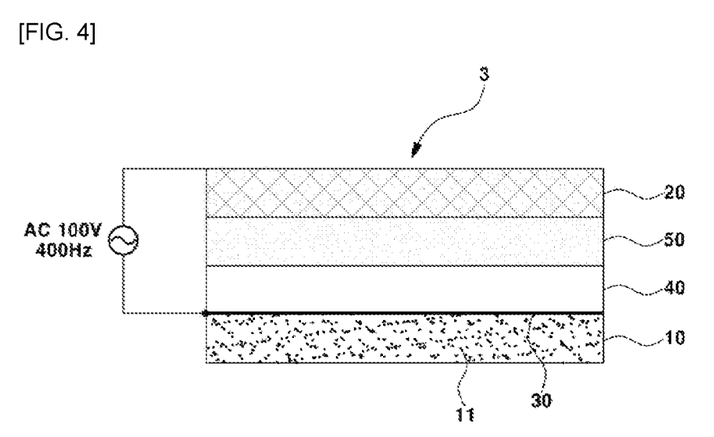
FIG. 4 schematically illustrates the stacked structure of an inorganic electroluminescence device in which transparent electrode layers include a metal mesh substrate and a metal-patterned substrate, respectively.

FIG. 4 shows the structure of the manufactured electroluminescence device 3. Specifically, it includes a base substrate 10 including a light diffusing agent 11, and a metal-patterned substrate 30 stacked on the base substrate 10. On the metal-patterned substrate 30, a fluorescent powder layer 40 and a dielectric powder layer 50 are sequentially stacked, and on the dielectric powder layer 50, a metal mesh substrate 20 is stacked. In this case, the metal mesh substrate 20 and the metal-patterned substrate 30 are connected to each other by a copper wire.

Comparative Example 1

Figure 5:
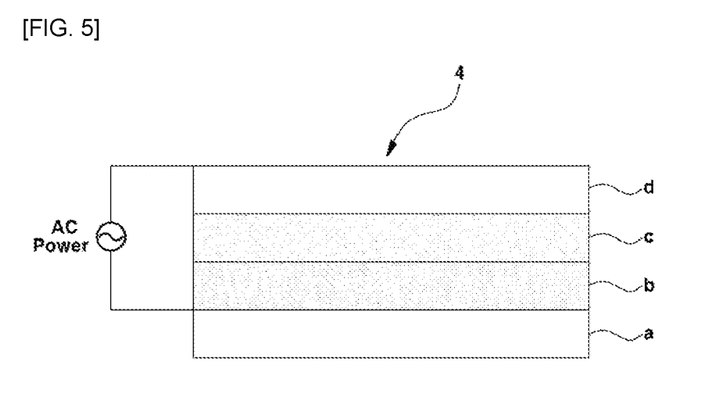
FIG. 5 illustrates the stacked structure of a conventional light-emitting device corresponding to Comparative Example 1.

A conventional ITO PET-based electroluminescence device 4 having the structure shown in FIG. 5 is manufactured. Specifically, it is formed to have a structure in which an ITO (indium tin oxide)-coated PET film (a) as an underlying layer is provided and a fluorescent powder layer (b), a dielectric powder layer (c) and a silver electrode layer (d) are sequentially stacked on the PET film (a). Here, the fluorescent powder layer (b) includes a fluorescent powder including zinc sulfide (ZnS), copper (Cu) and manganese (Mn), and the dielectric powder layer (c) includes $BaTiO_3$ dielectric powder. In addition, a power source (AC 100 V, 400 Hz) is provided which is positively connected to the underlying PET film (a) by a copper wire and negatively connected to the uppermost silver electrode layer (d). Each of the layers is formed by a screen printing method.

Test Example 1

Measurement of Luminance, Wavelength and Light Uniformity for Inorganic Electroluminescence Devices The inorganic electroluminescence devices manufactured in Examples 1 and 2 above were driven, and the luminance, wavelength and light uniformity of light emitted therefrom were measured. The results of the measurements are shown in Table 1 below.

TABLE 1

|  | Example 1 | Example 2 |
| --- | --- | --- |
| Luminance | 50 cd/m$^2$ | 60 cd/m$^2$ |
| Wavelength | 505 nm | 505 nm |
| Light uniformity | 50 μm | 50 μm |

Test Example 2

Application of Inorganic Electroluminescence Device to Sunblind for Vehicles

A sunblind fabric for vehicles was bonded to the inorganic electroluminescence device of Example 1 above by an adhesive (hot-melt film). For the bonding, the hot-melt film was melted by heat pressing at 120° C.

The luminance, wavelength and light uniformity of light emitted from the resulting product are shown in Table 2 below. In addition, the product was subjected to a heat resistance test (operated at a temperature of 90° C. for 12 hours), a moisture resistance test (operated at a humidity of 9% and a temperature of 50° C. for 12 hours) and a heat shock test (repeatedly operated for 50 cycles at a temperature ranging from −40° C. to 80° C.), and the results of the tests are shown in Table 3 below.

TABLE 2

| Luminance | 30 cd/m$^2$ |
| --- | --- |
| Wavelength | 505 nm |
| Light uniformity | 50 μm |

TABLE 3

|  | Initial stage (before test) | Late stage (end of test) |
| --- | --- | --- |
| Heat resistance test | 30 cd/m$^2$ | 24 cd/m$^2$ |
| Moisture resistance test | 30 cd/m$^2$ | 30 cd/m$^2$ |
| Heat shock test | 30 cd/m$^2$ | 30 cd/m$^2$ |

* Changes in wavelength and light uniformity were not observed, and thus were omitted.

Test Example 3

Figure 7:
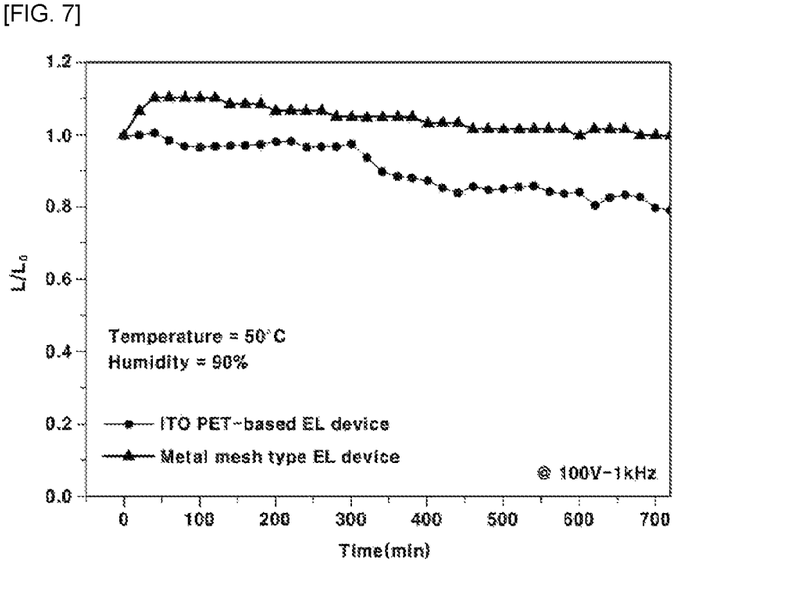
FIG. 7 is a graph showing the results of a moisture resistance test for Example 1 and Comparative Example 1.
Figure 8:
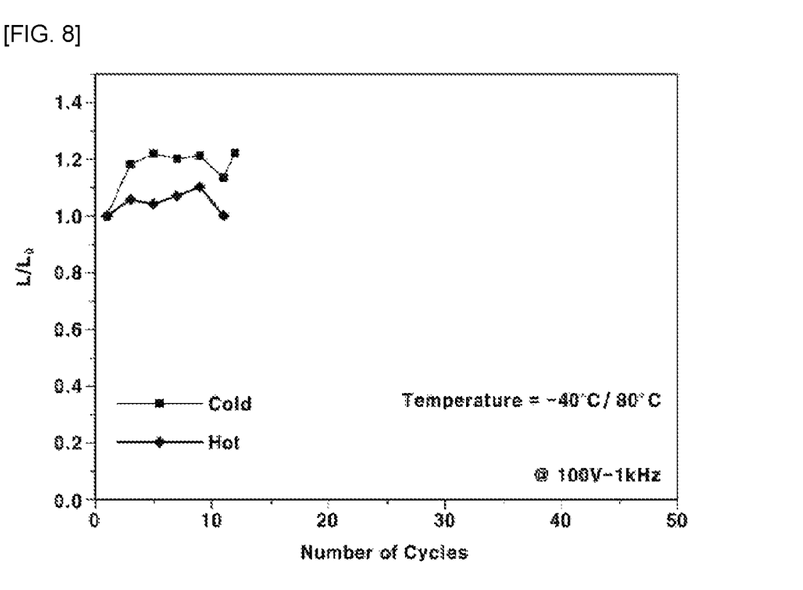
FIG. 8 is a graph showing the results of a heat shock test for Comparative Example 1.

Using the devices manufactured in Comparative Example 1 and Example 1 above, the heat resistance test, moisture resistance test and heat shock test described in Test Example 2 above were performed. The results of the tests are shown in FIGS. 6 to 8 and summarized in Table 4 below.

TABLE 4

|  | Comparative Example 1 | Example 1 |
|---|---|---|
| Luminous intensity of device | 50 cd/m$^2$ | 50 cd/m$^2$ |
| Heat resistance test | Decreased to 63% | Slightly decreased to 87% |
| Moisture resistance test | Decreased to 80% | Maintained at 100% |
| Heat shock test | Not luminous before or after about 10 cycles | Luminous even after 50 cycles |

Figure 6:
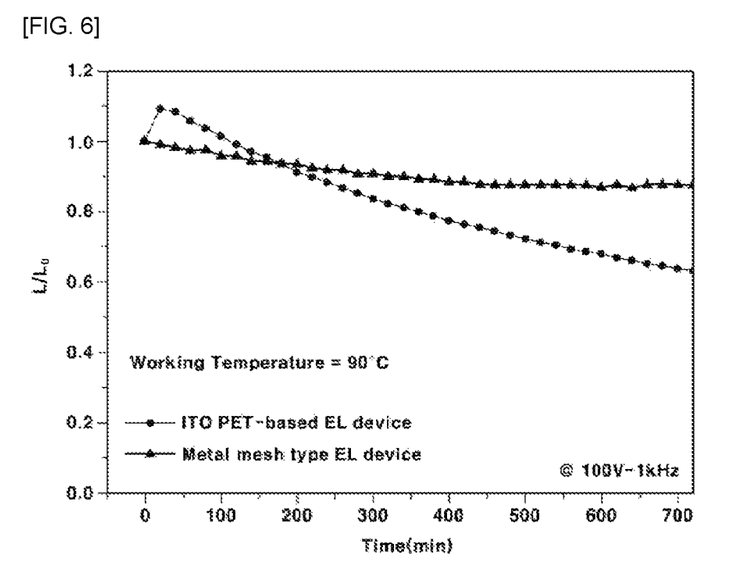
FIG. 6 is a graph showing the results of a heat resistance test for Example 1 and Comparative Example 1.

FIG. 6 is a graph showing the results of a heat resistance test for the devices of Example 1 and Comparative Example 1. Referring to FIG. 6, it can be seen that the ITO PET-based EL device showed a great decrease in luminance after 12 hours of operation, and the device based on the technology of the present disclosure ("Metal mesh type EL device") showed a slight decrease in luminance. It can be confirmed that in high-temperature operation, the application of the technology of the present disclosure shows better high-temperature durability than the application of the conventional art.

FIG. 7 is a graph showing the results of an operation test performed in a high-humidity environment. As can be seen therein, the ITO PET-based device showed a decrease in luminance after 12 hours of operation, but the device based on the technology of the present disclosure was hardly affected by humidity, and thus the luminance thereof was maintained without changes.

Figure 9:
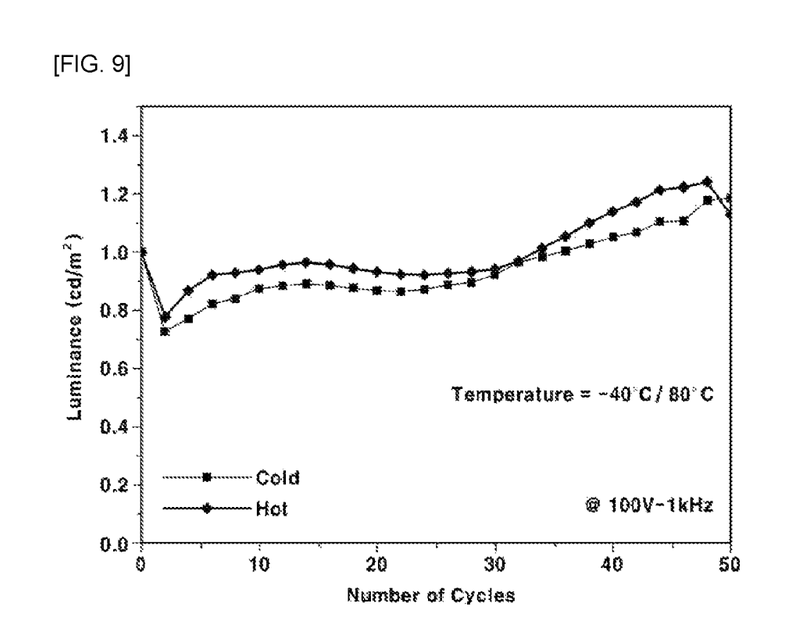
FIG. 9 is a graph showing the results of a heat shock test for Example 1.

FIGS. 8 and 9 are graphs showing the results of a heat shock test for the devices of Comparative Example 1 and Example 1, respectively.

Referring to FIG. 8, it was confirmed that in the case of Comparative Example 1, the resistance of the ITO PET-based EL device increased rapidly due to several rapid temperature cycles, and thus the ITO PET-based EL device became non-luminous, making it impossible to maintain the operation of the device.

However, referring to FIG. 9, it can be confirmed that in the case of the device based on the technology of the present disclosure, even when the inorganic electroluminescence device was subjected to dozens of rapid temperature cycles, the electrical properties thereof were not reduced and the operation thereof was maintained smoothly. It is expected that this strong resistance against heat shock can be applied even to extreme environments such as vehicles.

As described above, according to the present disclosure, the following effects are provided.

It is possible to improve the heat resistance, moisture resistance and heat shock resistance of an inorganic electroluminescence device.

It is possible to achieve a surface light source similar to a conventional inorganic electroluminescence device while reducing the manufacturing cost.

It is possible to provide an inorganic electroluminescence device having improved light uniformity due to the substrate included in the transparent electrode layer.

The effects of the present disclosure are not limited to the above-mentioned effects. It should be understood that the effects of the present disclosure include all effects that can be inferred from the above description.

As described above, although the embodiments of the present disclosure have been described in detail, the claims of the present disclosure is not limited to the above-described embodiments, and various modifications and improvements by those skilled in the art using the basic concept of the present disclosure defined in the appended claims can also be included the claims of the present disclosure.

What is claimed is:

1. A method for manufacturing an inorganic electroluminescence device, comprising:
    forming a transparent electrode layer;
    forming a dielectric powder layer and a fluorescent powder layer on the transparent electrode layer; and
    sequentially stacking a hot-melt layer comprising a thermoplastic adhesive and a blind fabric layer under the transparent electrode layer,
    wherein the transparent electrode layer comprises a metal mesh substrate,
    wherein the transparent electrode layer, the dielectric powder layer and the fluorescent powder layer are stacked to contact one another, and
    wherein the metal mesh substrate comprises a metal mesh having openings.

2. The method of claim 1, wherein the metal mesh substrate comprises stainless steel.

3. The method of claim 1, further comprising, after the forming the dielectric powder layer and the fluorescent powder layer, forming a second transparent electrode layer on the fluorescent powder layer.

4. The method of claim 1, wherein, when the transparent electrode layer comprises the metal mesh substrate, the forming the transparent electrode layer comprises:
    preparing a glass sheet;
    providing a metal mesh on the glass sheet; and
    applying a polymer material onto the glass sheet provided with the metal mesh.

5. The method of claim 4, wherein a distance between the openings of the metal mesh is 5 to 20 μm, a thickness of the metal mesh is 20 to 100 μm, and a width of the opening included in the metal mesh is 20 to 100 μm.

6. The method of claim 4, wherein the polymer material comprises 10 to 50 wt % of a light diffusing agent.

7. An inorganic electroluminescence device comprising:
    a base substrate;
    a transparent electrode layer;
    a dielectric powder layer; and
    a fluorescent powder layer,
    wherein the transparent electrode layer comprises a metal mesh substrate,
    wherein the transparent electrode layer, the dielectric powder layer and the fluorescent powder layer are sequentially stacked to contact one another,
    wherein the metal mesh substrate comprises a metal mesh having openings, and
    wherein a hot-melt layer comprising a thermoplastic adhesive and a blind fabric layer are sequentially disposed under the transparent electrode layer.

8. The inorganic electroluminescence device of claim 7, wherein the transparent electrode layer is disposed on any one of under the fluorescent powder layer or on the dielectric powder layer.

9. The inorganic electroluminescence device of claim 7, wherein, when the transparent electrode layer comprises the metal mesh substrate, the transparent electrode layer comprises: a metal mesh comprising openings; and a polymer material filled in the openings.

10. The inorganic electroluminescence device of claim 9, wherein the polymer material comprises any one selected from the group consisting of polyethylene terephthalate, polyvinyl chloride, and a combination thereof.

11. The inorganic electroluminescence device of claim 7, wherein the metal mesh substrate comprises stainless steel.

12. The inorganic electroluminescence device of claim 7, wherein a width of the opening of the metal mesh is 20 to 100 μm, and a distance between the stripes of the metal-patterned substrate is 20 to 100 μm.

* * * * *